United States Patent [19]

Rickman, Jr.

[11] 4,439,728
[45] Mar. 27, 1984

[54] MOTION SENSOR UTILIZING EDDY CURRENTS

[75] Inventor: James D. Rickman, Jr., Boxford, Mass.

[73] Assignee: RCA Corporation, New York, N.Y.

[21] Appl. No.: 331,272

[22] Filed: Dec. 16, 1981

[51] Int. Cl.³ ............................ G01P 3/46; G01P 3/52
[52] U.S. Cl. .................................... 324/164; 324/208; 324/174
[58] Field of Search ............... 324/164, 166, 174, 208, 324/239; 73/519, 520, 861.77, 861.78

[56] References Cited

PUBLICATIONS

Kripl, Brushless Tachometer System, IBM Technical Disclosure Bulletin, Jun. 1973, pp. 237 & 238.

*Primary Examiner*—Stanley T. Krawczewicz
*Attorney, Agent, or Firm*—J. S. Tripoli; R. L. Troike; R. E. Smiley

[57] ABSTRACT

A sensor for measuring motion past the sensor of a non-magnetic conductive part surrounded by a non-magnetic conductive shield. The sensor consists of a bias magnet and pickup coil located outside the shield. Eddy currents are generated in the part as it moves through the magnetic field of the bias magnet. The eddy currents create an electromagnetic field around the part that penetrates the conductive shield causing the generation of secondary eddy currents in the shield. Secondary electromagnetic fields created by the secondary eddy currents induce a voltage in the pickup coil, a parameter of which is indicative of motion of the part.

9 Claims, 1 Drawing Figure

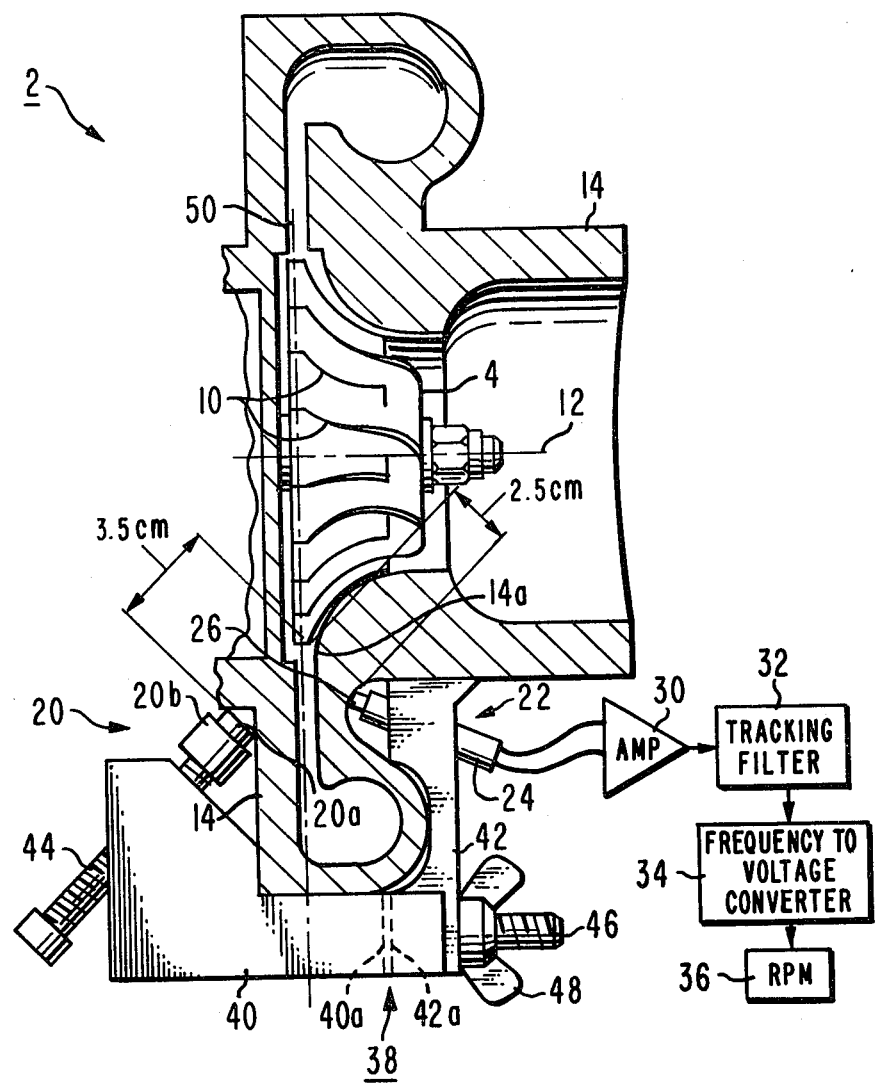

MOTION SENSOR UTILIZING EDDY CURRENTS

This invention is concerned with motion sensors for detecting the motion of a moving non-magnetic conductive part past the sensor and more particularly with detecting such motion where a non-magnetic conductive shield is positioned between the moving part and sensor.

Existing motion sensors can detect the motion of a magnetic part or succession of parts past the sensor. The parts can be in linear or circular motion. Such sensors normally comprise a permanent magnet or DC electromagnet and a pickup coil, each positioned near the moving part. The part(s) must be of non-uniform design such as teeth of a toothed wheel but non-uniformities almost always exist in even seemingly uniform materials such as round disc, which non-uniformities cause flux change in the field applied by the magnet. Such flux changes are detected by the pickup coil. Where there are a succession of parts moving linearly or in a circle, for example, the signals produced by the pickup coil may be converted, by conventional electronics, to frequency indicating signals. In the case of rotating parts, where the number of parts is known, the frequency is generally calibrated in revolutions per minute (RPM).

Such motion sensors are also used to detect motion past the sensor of one or more non-magnetic but conductive parts such as aluminum blades. With such non-magnetic parts the magnet produces a flux field through which the parts pass. As a result, eddy currents are induced in the parts which cause an electromagnetic field to be produced which in turn is detected by the pickup coil. In the case of a plurality of parts the amplitude of the electromagnetic field is modulated at the frequency of motion due to a variation in eddy current strength resulting from alternate passage of parts and air gaps. For example, in the case of aluminum blades separated by air gaps, the pickup coil senses a variation in the eddy current produced electric field as blades and air gaps alternately move past the coil. As with other magnetic parts, conventional electronics convert the signal so produced to a frequency or speed indication.

The electromagentic field is weak near the moving parts and decreases rapidly as a function of distance therefrom. In some applications a non-magnetic conductive shield, made of a material such as aluminum, placed between the moving parts and sensor, decreases the weak electromagnetic signal even further. The depth of penetration of an electromagnetic field into the interior of a substance, such as an aluminum shield can be determined from the skin depth s, where:

$$s = (2/\mu\omega\sigma)^{\frac{1}{2}} \qquad (1)$$

The skin depth s, the conductivity $\sigma$ and the permeability $\mu$ are in mks units (meter-kilogram-second) and $\omega$ is the angular frequency of the electromagnetic field in radians per second. At the distance s into the material the electromagnetic field amplitude is 1/e of that at the surface, where e is the base of the natural logarithm, approximately 2.7.

Equation (1) appears in Reitz, J. and Milford, F., Foundations of Electromagnetic Theory, Second Edition, Reading, Mass.; Addison Wesley, 1967, Page 305, equation 15–50. Other textbooks have similar formulas but the measurement units may differ. Thus, assuming a part having blades that move past the pickup coil at the rate of 10,000 blades per second producing an eddy current generated electromagnetic field of the same frequency as the blades and assuming in an aluminum shield, a typical skin depth s is approximately 0.1 centimeters. For a stainless steel shield the skin depth is even less at about 0.03 centimeters. Therefore, in accordance with classical theory, it would be considered impractical to detect high frequency electromagnetic fields through any practical thickness of shield.

The inventor has discovered that the eddy currents created in the moving parts lead to the creation of secondary eddy currents in the shield which are of sufficient magnitude to cause a measurable voltage to be induced in the pickup coil. In the case of a succession of parts, the voltage is modulated at the frequency at which the parts pass the sensor.

In accordance with a preferred embodiment of the present invention, a sensor for measuring the passage of a non-magnetic conductive part separated from the sensor by a non-magnetic conductive shield within which the part passes comprises the combination of a bias magnet and transducer means. The bias magnet is adapted to be positioned adjacent the shield for inducing a flux field in the moving part inducing an eddy current therein. The transducer means is adapted to be positioned adjacent the shield for producing a signal in response to eddy currents created in the shield due to passage of the part.

In the drawing:

The sole FIGURE is a mechanical and electrical schematic representation of a motion sensor used for determining the rotational speed of an engine turbocharger illustrated in cross-section in accordance with a preferred embodiment of the invention.

With reference to the FIGURE, which illustrates only a portion of an engine turbocharger 2 and that portion shown in cross-section, a rotating blade assembly 4 containing blades 10 rotates about an axis 12 by a drive means not shown. In accordance with the invention, assembly 4 including blades 10 is made of non-magnetic but conductive material such as aluminum. Assembly 4 is surrounded by a housing 14 only a small portion of which is illustrated in FIG. 1. For purposes of the invention, the housing can be thought of as a shield 14 (hereinafter so-described) made of non-magnetic but conductive material such as aluminum.

The major components of a sensor assembly capable of detecting part motion are a permanent magnet 20 and a sense coil assembly 22 each positioned as near blades 10 as the shape of shield 14 will permit by means to be described. Samarium-cobalt is an ideal material for magnet 20 because it projects a relatively high field strength for a relatively small volume of magnet. Because of the particular shape of shield 14, permanent magnet 20 actually consists of two cylindrical magnets, one 20a which may be 5 millimeters (mm) in width and 13 mm in diameter and one 20b which may be 15 mm in width and 19 mm in diameter. Such magnets may be purchased from Hitachi Magnetics Corporation, Edmore, Mich. 48829. The two magnets are held together by magnetic attraction.

Pickup coil assembly 22 includes at least a wire coil 24 and preferably a pole piece 26 around which the wire is wound. In one experimental sensor a pickup coil assembly 22 is a commercially available magnetic reluctance sensor distributed by North American Phillips Controls Corporation, Ft. Lauderdale, Fla., as Model No. 085-101-0053. The commercial version includes a 5,000 turn coil 24 of 48 gauge copper wire, a stainless steel pole piece 26 and an Alnico V permanent magnet (not shown). A custom made pickup coil would have no permanent magnet and would have an air or ferrite core for highest signal pickup. Coil 24 is connected to a conventional amplifier 30 which, in turn, is connected to a tracking filter 32. The tracking filter is series connected with a conventional frequency-to-voltage converter 34 and an RPM measuring device 36. As will be described in more detail hereinafter, the signal produced by coil 24 is sinusoidal with one cycle for each blade 10 passage. Thus, the signal produced by coil 24 has a frequency proportional to the number of blade passages per unit time.

A particularly suitable tracking filter 32 is described in an article entitled, "Non-Contact Diagnosis of Internal Combustion Engine Faults Through Remote Sensing," by S. Hadden, L. B. Hulls and E. M. Sutphin in the proceedings of the Society of Automotive Engineers, Automotive Engineering Congress and Exposition, Detroit, Mich., Feb. 23-27, 1976 at page 6, particularly FIG. 10 thereof. The purpose of tracking filter 32 is to track and pass that frequency associated with the part motion while rejecting frequencies due to electrical noise, engine vibration, etc. Frequency-to-voltage converter 34 converts the frequency of motion of blades or parts 10 to a voltage proportional to frequency.

It is essential that pickup coil assembly 22 be secured tightly to shield 14. Otherwise the turbocharger vibration would cause a signal to be produced by coil 24 which is greater in amplitude than the desired signal produced due to the motion of blades 10. Therefore, a clamp assembly 38 secures magnet 20 and sensor assembly 22 in position on the turbocharger housing or shield 14. The clamp assembly 38 consists of a first clamp member 40 and a second clamp member 42 both of which may be of aluminum. Member 42 resides in a slot in member 40, the base of the slot being defined by dashed line 40a. Dashed line 42a marks the periphery of member 42 which is hidden by the right portion of member 40. This arrangement prevents axial motion of member 42 relative to member 40 about screw 46. A screw 44 of magnetic material is screwed into and through member 40. Magnet 20 may be simply secured to the end of screw 44 by magnetic attraction. Member 42 holds pickup coil assembly 22 which is screwed into and through member 42. A screw 46 secured to member 40 and passing through an opening in member 42 in combination with a wingnut 48 serves to secure the entire assembly to shield 14. Once the assembly is secured in place by the tightening of wingnut 48, screw 44 is turned until magnet 20 is in contact with shield 14.

Due to the particular shape of shield 14 and shape of blades 10, there is a considerable distance between each of permanent magnet 20 and assembly 22 to blades 10. In a particular embodiment with one commercial turbocharger, the approximate distance from magnet 20 to blades 10 is 3.3 centimeters. The distance from blades 10 to pickup coil 22 is approximately 2.5 centimeters and the shield 14 is constructed of material of varying thickness as illustrated in the FIGURE but which, in one embodiment, has been measured to be at least 0.635 centimeters in the region between pickup coil assembly 22 and blades 10. This thickness is much greater than the 0.1 centimeter skin depth predicted by equation (1) for a 10 kilohertz electromagnetic field.

It has been found, through experimentation, that the magnet 20 and pickup coil assembly 22 ideally should be on opposite sides of a plane indicated by dashed line 50, FIG. 1, passing through moving blades 10 normal to the axis of rotation 12.

In operation, when it is desired to detect the passage by pickup coil assembly 22 of blades 10, clamping arrangement 38 is positioned on the shield 14 such that magnet 20 and pickup coil 22 are as close as possible to blades 10 to ensure a proper sensing of part motion. Magnetic screw 44 is tightened until magnet 20 is in contact with shield 14.

Magnet 20 creates a field which encompasses blades 10. In an exemplary embodiment the field at each blade 10 measured approximately 40 gauss. The motion of blades 10 through the field created by magnet 20 causes eddy currents to be induced in the moving blades 10. The electromagnetic fields produced by the eddy currents decrease in strength with distance from blades 10. However, a weak electromagnetic field exists at the inside portion 14a of shield 14. The electromagnetic field produced by eddy currents induced in the blades 10 and present at surface 14a is caused to increase and decrease in amplitude due to the rotation of blade assembly 4 and therefore passage of blades 10. The oscillating electromagnetic field at shield surface 14a induces secondary eddy currents in the shield which in turn generate a secondary oscillating electromagnetic field. It is this secondary field which produces magnetic flux variations through the pickup coil that induce a coil voltage with a frequency equal to the blade passage frequency.

In one exemplary turbocharger, the spacing along the circumference of the blades is on the order of 2 centimeters. The spacing is close enough such that the influence of an approaching blade on the flux through the sensor is felt before the flux due to a previously retreating blade has been reduced to a negligible amount. This leads to a smooth sinusoidal time variation in output signal from coil 24.

The electromagnetic field fluctuations within shield 14 are strongly attenuated as they act to drive secondary eddy currents. As mentioned in the background section, a 10 kilohertz field is largely dissipated within approximately 0.1 centimeters penetration into shield 14. The secondary eddy currents generate secondary electromagnetic fields within shield 14 that provide the predominant exitation of coil 24. The resulting frequency of the voltage signal induced in coil 24 is related to the number of blade 10 passages per unit time. The number of blades in the turbocharger assembly 4 is known. Therefore it is easy to calculate the rotational frequency, f, in revolutions per minute (RPM) utilizing the following formula:

$$f = \omega/2\pi N \tag{2}$$

where $\omega$ is the angular frequency in radians per second of the voltage signal produced by coil 24 and N is the number of blades. In the preferred embodiment, the coil voltage frequency $\omega$ is determined from the frequency-to-voltage converter 34 output voltage.

It will be realized that the sensor assembly described is not limited solely to measuring blade rotational speed, but may measure motion of any non-magnetic but conductive part passing the motion sensor. One or more parts could be in linear motion and could be closely or widely separated with the signal produced by coil 24 indicative of the passage by the pickup coil 22 of each part.

What is claimed is:

1. Apparatus for measuring passage of a non-magnetic conductor part separated from the apparatus by a non-magnetic conductor shield within which said part passes, comprising in combination:
   a bias magnet adapted to be positioned adjacent said shield for establishing a DC flux in said part; and
   a transducer means adapted to be positioned adjacent said shield for producing a signal in response to eddy currents created in said shield due to passage of said part.

2. Rotational speed measuring apparatus for measuring the rotational speed of a non-uniform rotatable non-magnetic conductive part having an axis of rotation within a surrounding non-magnetic conductive shield, comprising in combination:
   a bias magnet adapted to be positioned adjacent said shield on one side of a plane through said part and normal to said rotational axis for establishing a DC flux in said part; and
   transducer means located adjacent said shield on the opposite side of said plane for producing a signal in response to eddy currents created in said shield due to rotation of said part.

3. Rotational speed measuring apparatus, comprising in combination:
   a rotatable non-magnetic conductive part having physical non-uniformity therein, said part being rotatable about an axis of rotation;
   a non-magnetic conductive shield substantially surrounding said part and spaced therefrom to enable said part to rotate within said shield;
   a bias magnet positioned adjacent said shield on one side of a plane through said part normal to said axis for establishing a DC magnetic flux in said part; and
   a transducer means located adjacent said shield on the opposite side of said plane for producing a signal in response to eddy currents created in said shield due to rotation of said part.

4. The combination as set forth in claims 1, 2 or 3 further including clamping means for clamping said bias magnet and transducer means to said shield.

5. The combination as set forth in claims 1, 2 or 3 wherein said bias magnet is a permanent magnet.

6. The combination as set forth in claim 5 wherein said magnet is a Samarium-cobalt magnet.

7. The combination as set forth in claims 1, 2 or 3 wherein said transducer means comprises a sense core and a sense coil wound around said sense core.

8. The combination as set forth in claims 2 or 3 wherein said rotatable part comprises a plurality of blades passing seriatum through the flux produced by said bias magnet.

9. The combination as set forth in claims 2 or 3 wherein said part and shield comprise a turbocharger.

* * * * *